United States Patent [19]

Ohno

[11] Patent Number: 5,355,413
[45] Date of Patent: Oct. 11, 1994

[54] AUTHENTICATION METHOD PERFORMED BETWEEN IC CARD AND TERMINAL UNIT AND SYSTEM THEREFOR

[75] Inventor: Hisashi Ohno, Itami, Japan

[73] Assignee: Mitsubishi Denki Kabushiki Kaisha, Tokyo, Japan

[21] Appl. No.: 24,319

[22] Filed: Mar. 1, 1993

[30] Foreign Application Priority Data

Mar. 6, 1992 [JP] Japan ................. 4-049830

[51] Int. Cl.$^5$ ............................................. H04L 9/32
[52] U.S. Cl. ........................................ 380/24; 380/23
[58] Field of Search ............................ 380/23, 24, 25

[56] References Cited

U.S. PATENT DOCUMENTS

| | | | |
|---|---|---|---|
| 4,544,833 | 10/1985 | Ugon | 235/379 |
| 4,716,586 | 12/1987 | Bauer | 380/23 X |
| 4,720,860 | 1/1988 | Weiss | 380/23 |
| 4,800,590 | 1/1989 | Vaughan | 380/25 |
| 4,811,393 | 3/1989 | Hazard | 380/21 |
| 5,101,430 | 3/1992 | Periou | 380/23 |
| 5,189,700 | 2/1993 | Blandford | 380/23 |
| 5,225,664 | 7/1993 | Iijma | 380/23 |

FOREIGN PATENT DOCUMENTS

| | | |
|---|---|---|
| 2224937 | 5/1972 | Fed. Rep. of Germany . |
| 2826469 | 6/1978 | Fed. Rep. of Germany . |
| 2949351 | 12/1979 | Fed. Rep. of Germany . |
| 3122534 | 6/1981 | Fed. Rep. of Germany . |

Primary Examiner—Gilberto Barrón, Jr.
Attorney, Agent, or Firm—Leydig, Voit & Mayer

[57] ABSTRACT

In an authentication method between an IC card and a terminal unit, authentication is performed without an authentication code or an address therefor being transmitted directly between the two devices so as to assure the security of the authentication operation. Both of the IC card and the terminal unit include multiple authentication codes each code having a corresponding time data item, and an encryption algorithm. In one of the IC card and the terminal unit, one of the authentication codes is selected, and the selected authentication code is encrypted according to the encryption algorithm. The encrypted authentication code is transmitted to the other device as authentication data. The time data corresponding to the selected authentication code is transmitted to the other device as a time interval between commands or signals. In the other device, the authentication code obtained from the time data is encrypted according to the encryption algorithm to generate authentication data. The generated authentication data is compared with the authentication data sent from the other device.

13 Claims, 19 Drawing Sheets

| TIME (72) | KEY (73) |
|---|---|
| TA | A |
| TB | B |
| TC | C |
| TD | D |
| | |

| TIME (72) | KEY (73) |
|---|---|
| TA | A |
| TB | B |
| TC | C |
| TD | D |
| | |

| TIME (74) | KEY (73) |
|---|---|
| KA | A |
| KB | B |
| KC | C |
| KD | D |

5-e, 24-c

AUTHENTICATION METHOD PERFORMED BETWEEN IC CARD AND TERMINAL UNIT AND SYSTEM THEREFOR

BACKGROUND OF THE INVENTION

1. Field of the Invention

The present invention relates to an authentication method performed between an IC card and a terminal unit, and a system therefor.

2. Description of the Related Art

Conventional authentication methods between an IC card and a terminal unit have been disclosed in, for example, Japanese Patent Laid-Open No. Sho 59-77575 (Japanese Patent Publication No. Hei 3-40879). In this authentication method, a random number is generated first in the terminal unit, and then the generated random number is sent to the card together with an address specifying the desired authentication code stored in the card. In the IC card, the authentication code corresponding to the given address is obtained. Thereafter, a predetermined processing is performed using the given random number and the obtained authentication code by an encryptor in the IC card itself, and the obtained result of the processing is transmitted to the terminal unit. The terminal unit is also provided with data on the authentication code and the encryptor, like the IC card. Therefore, the terminal unit performs the similar processing to that performed in the IC card on the random number and the authentication code using the encryptor. If the result of the processing performed by the terminal unit coincides with the result of the processing sent from the IC card, the identity of the IC card is established to the terminal unit.

In the conventional authentication method between the IC card and the terminal unit which is performed in the manner described above, an address indicating the location where the authentication code is stored is directly given to the IC card from the terminal unit in order to obtain a desired authentication code. Thus, there is the possibility that the location where the authentication code is stored and the contents thereof may be disclosed to an unauthorized user.

SUMMARY OF THE INVENTION

Accordingly, an object of a present invention is to provide an authentication method which does not allow the fraudulent user to know the address where an authentication code is stored in an IC card, and a system therefor.

In order to achieve the above objects, according to one aspect of the present invention, there is provided an authentication method for two devices, an IC card and a terminal unit, in which both the IC card and the terminal unit include a plurality of authentication codes each having a corresponding time data item, encryption means for encrypting data according to a predetermined algorithm, and timer means, one of the two devices, the IC card or the terminal unit, further including means for generating random numbers, and comparison means, the authentication method comprising:

generating a random number in a first device of the IC card and the terminal unit, and transmitting the generated random number to the second device of the IC card and the terminal unit;

a first encryption step of encrypting the received random number in the second device according to an algorithm using one of the plurality of authentication codes as a key for generating authentication data;

transmitting the encrypted authentication data to the first device from the second device when a time represented by time data corresponding to the authentication code used has elapsed following transmission of a predetermined signal;

a second encryption step of counting, in the first device, a time interval from the transmission of the predetermined signal to reception of the authentication data from the second device and encrypting the random number according to the algorithm using, as a key, the authentication code corresponding to the time data which coincides with the counted time interval in the same manner as that in the second device to generate authentication data; and comparing, in the first device, the authentication data generated in the second encryption step with the authentication data which has been transmitted from the other device and transmitting a result signal indicating coincidence or non-coincidence to the second device.

In a preferred embodiment of the present invention, an identifier is allocated to each of the plurality of authentication codes in place of the time data, and this identifier is encrypted and transmitted. In the reception side, the selected authentication code is obtained from the identifier and the random number is encrypted using the obtained authentication code as a key to generate authentication data. The generated authentication data is compared with the authentication data which has been transmitted for authentication.

According to another aspect of the present invention, there is provided a system which includes an IC card and a terminal unit and which carries out the authentication method.

In the authentication method according to the present invention, both the IC card and the terminal unit have a plurality of authentication codes each having a corresponding time data item. When the authentication code selected by one of the IC card and the terminal unit is transmitted to the other, the time data corresponding to the authentication data is transmitted to the other device as a time interval between commands. In the reception side, the selected authentication code is obtained from the time interval between the commands. In both the IC card and the terminal unit, a random number is encrypted according to the encryption algorithm using the authentication code as a key to generate authentication data. The generated authentication data are compared with each other. When they coincide, identity is mutually established.

In the preferred embodiment, an identifier is allocated to each of the plurality of authentication codes. When the authentication code selected by one of the IC card and the terminal unit is transmitted to the other, the identifier corresponding to the authentication data is encrypted according to the identifier encrypting algorithm, and the encrypted identifier is transmitted to the other device. In the reception side, the encrypted identifier is combined to obtain the identifier, and the authentication code is obtained using the identifier. In both the IC card and the terminal unit, a random number is encrypted according to the encryption algorithm using the authentication code as a key to generate authenticatin data. The generated authentication data are compared with each other. When they coincide, the identity is mutually established.

In any of these authentication methods, the authentication code and the address therefor are not transmitted directly between the two devices. Therefore, the authentication operation can be performed without the authentication code being disclosed to an unauthorized user.

BRIEF DESCRIPTION OF THE DRAWINGS

FIG. 3 illustrates the authentication codes and the corresponding time data which are stored in both a data memory of the IC card and in a data memory of the terminal unit;

FIG. 11 illustrates the authentication codes and the corresponding time data which are stored in both a data memory of the IC card and in a data memory of the terminal unit;

DETAILED DESCRIPTION OF THE PREFERRED EMBODIMENTS

Embodiments of the present invention will be described below with reference to the accompanying drawings.

Figure 1:
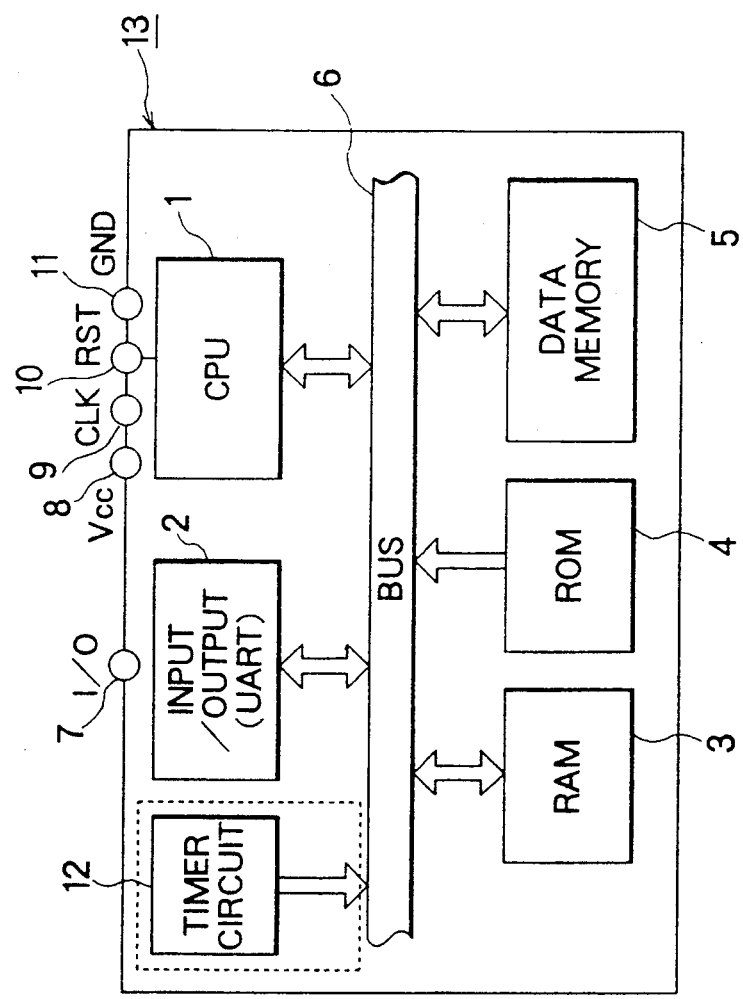
FIG. 1 is a block diagram showing the functional structure of an IC card used in the present invention.

FIG. 1 shows the functional structure of an IC card used in the present invention. In FIG. 1, an IC card 13 includes a CPU 1, an input/output control circuit (hereinafter referred to as a UART) 2, a RAM 3, a ROM 4, a data memory 5 and an internal bus 6. UART 2 controls input and output of data through an I/O terminal 7. RAM 3 is a memory which temporarily stores the data used for calculations in CPU 1. ROM 4 is a read-only memory which stores the programs for driving CPU 1. The data memory 5 is a memory which stores identification codes (ID codes), identification code tables, an encryption algorithm and general data. The data memory 5 is in general a EEPROM. The internal bus 6 connects the aforementioned individual functional blocks with each other. IC card 13 further includes a power source terminal 8 (Vcc), a clock terminal 9 (CLK), a reset terminal 10 (RST) and a grounding terminal 11 (GND). A timer circuit 12 is used exclusively for time counting. This timer circuit 12 may be or may not be incorporated in the IC card of this invention.

The hardware structure of IC card 13 is the same as that of a conventional IC card. IC card 13 may have either a one-chip structure in which the data memory 5 is formed integrally with the other components or a multi-chip structure in which the data memory 5 is formed separately from the other components. IC card 13 is operated in the manner described below. When an instruction is given from outside of the card via the I/O terminal 7, the UART 2 and the bus 6, CPU 1 executes processing according to the program stored in ROM 4. The results of the processing are output outside of the card via an inverse path. The authentication operation (collation operation) according to the present invention is executed similarly.

Figure 2:
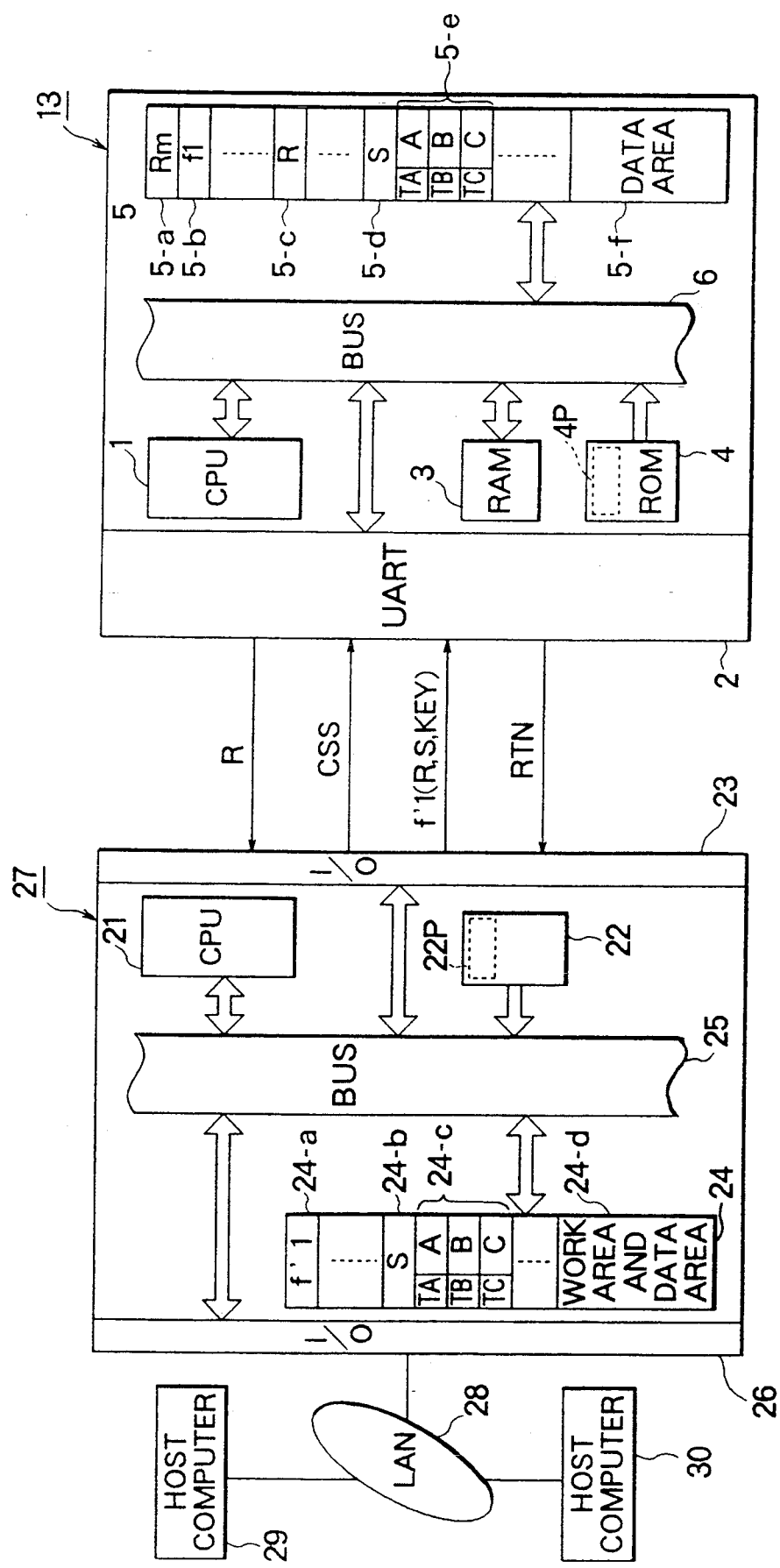
FIG. 2 is a block diagram showing the functional structure of a system including an IC card and a terminal unit according to a first embodiment of the present invention.
Figure 3:
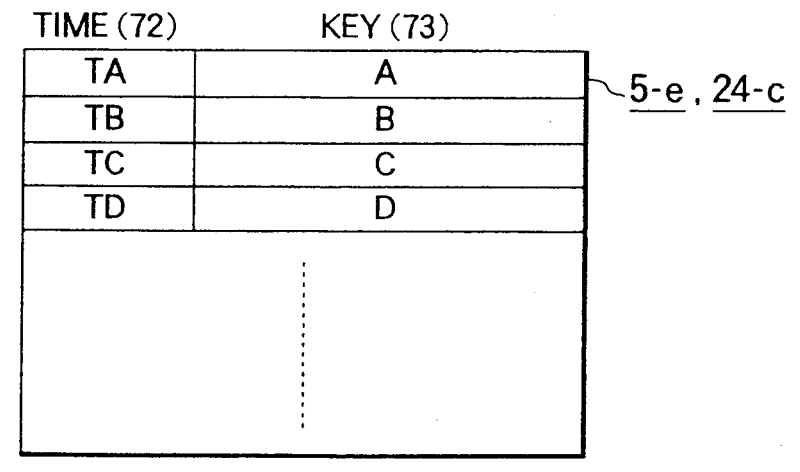

FIG. 2 is a block diagram showing the functional structure of a system consisting of the IC card and a terminal unit which are used in the first embodiment of the present invention. In FIG. 2, the IC card 13 is that shown in FIG. 1. Various data items are stored in the data memory 5 in the IC card 13. In an area 5-a of the data memory 5, a random number generation algorithm (Rm) is stored. In an area 5-b, an encryption algorithm (f1) is stored. In an area 5-c, random numbers (R) generated by the random number generation algorithm (Rm) are stored. In an area 5-d, a system key (S) used by the encryption algorithm (1l) is stored. In an area 5-e, a table showing the relation between a plurality of authentication codes (A, B, C, ...) for authentication and the time data (TA, TB, TC, ...) respectively allocated to these authentication codes is stored. An area 5-f is a data area used for general application programs. The structure of area 5-e in which the authentication codes (A, B, C, ...) are stored is shown in FIG. 3. The table consists of TIME 72 and KEY 73. Time data (TA, TB, TC, ...) of TIME 72 are respectively allocated to the individual authentication codes (A, B, C, ...) of KEY 73. The data corresponding to an authentication code is obtained using the authentication code as KEY.

In FIG. 2, a terminal unit 27 executes an authentication with the IC card 13. The terminal unit 27 may be a single terminal unit or may be connected to a LAN 29 which is in turn connected to host computers 29 and 30.

The structure of the terminal unit 27 is substantially the same as that of the IC card 13. That is, a CPU 21, a ROM 22, a data memory 24 for storing data and acting as a work area, an I/O (input/output control circuit) 23 for controlling input and output 26 are connected to each other in the manner shown in FIG. 2 via a bus 25. The data memory 24 stores various data items, like the data memory 5 of the IC card 13. In an area 24-a, an encryption algorithm (f1) is stored. In an area 24-b, a system key (S) used by the encryption algorithm (f1) is stored. In an area 24-c, authentication codes (A, B, C, . . . ) are stored for authentication. An area 24-d is a work area used as a temporary memory of CPU 21 or a data area for storing general application programs. The area 24-c in which the authentication codes (A, B, C) are stored is quite the same as the area 5-e in which the authentication codes are stored in the data memory 5 of the IC card 13 shown in FIG. 3.

Figure 4:
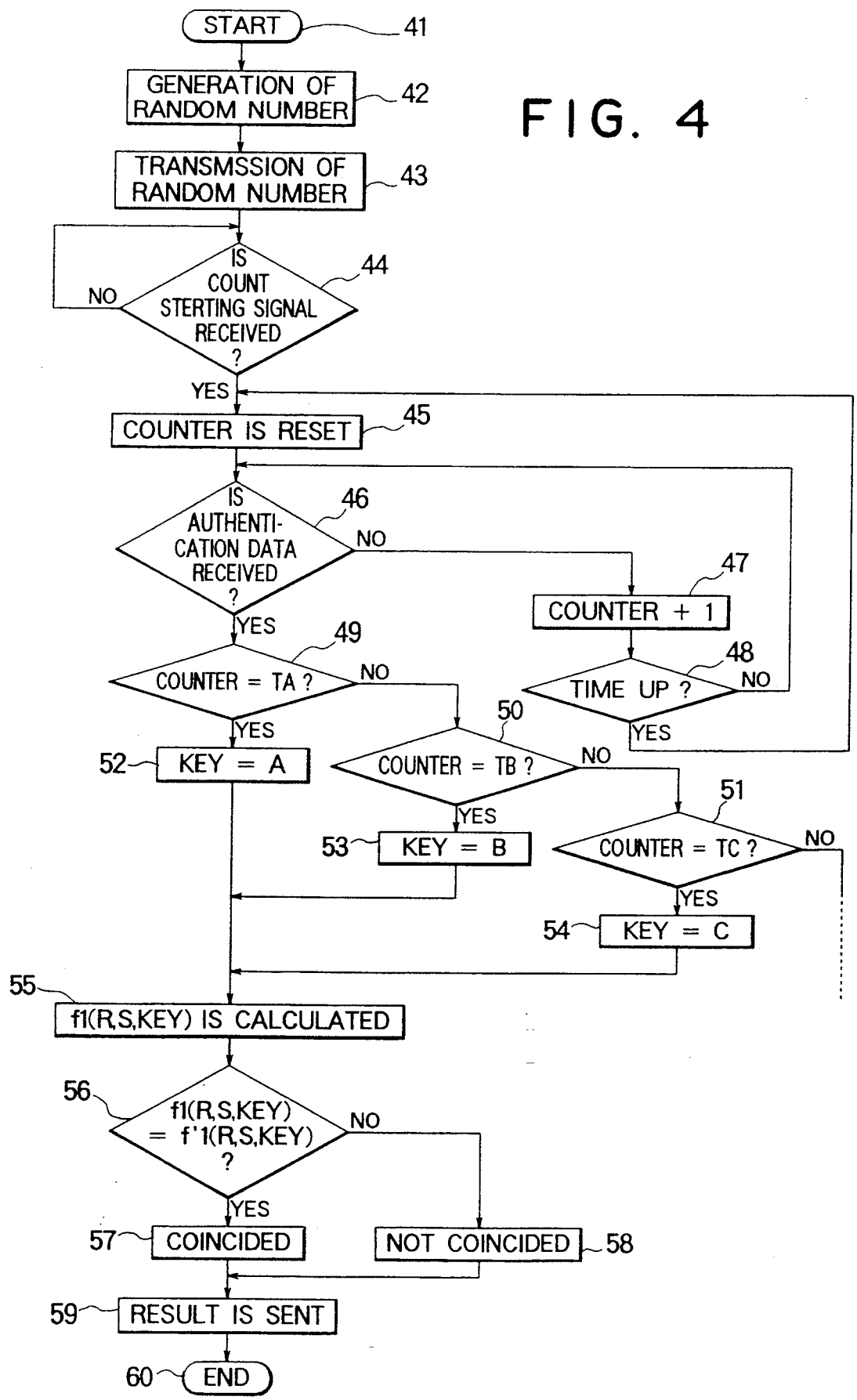
FIG. 4 is a flowchart showing the operation of the IC card in the authentication method according to the first embodiment of the present invention.
Figure 5:
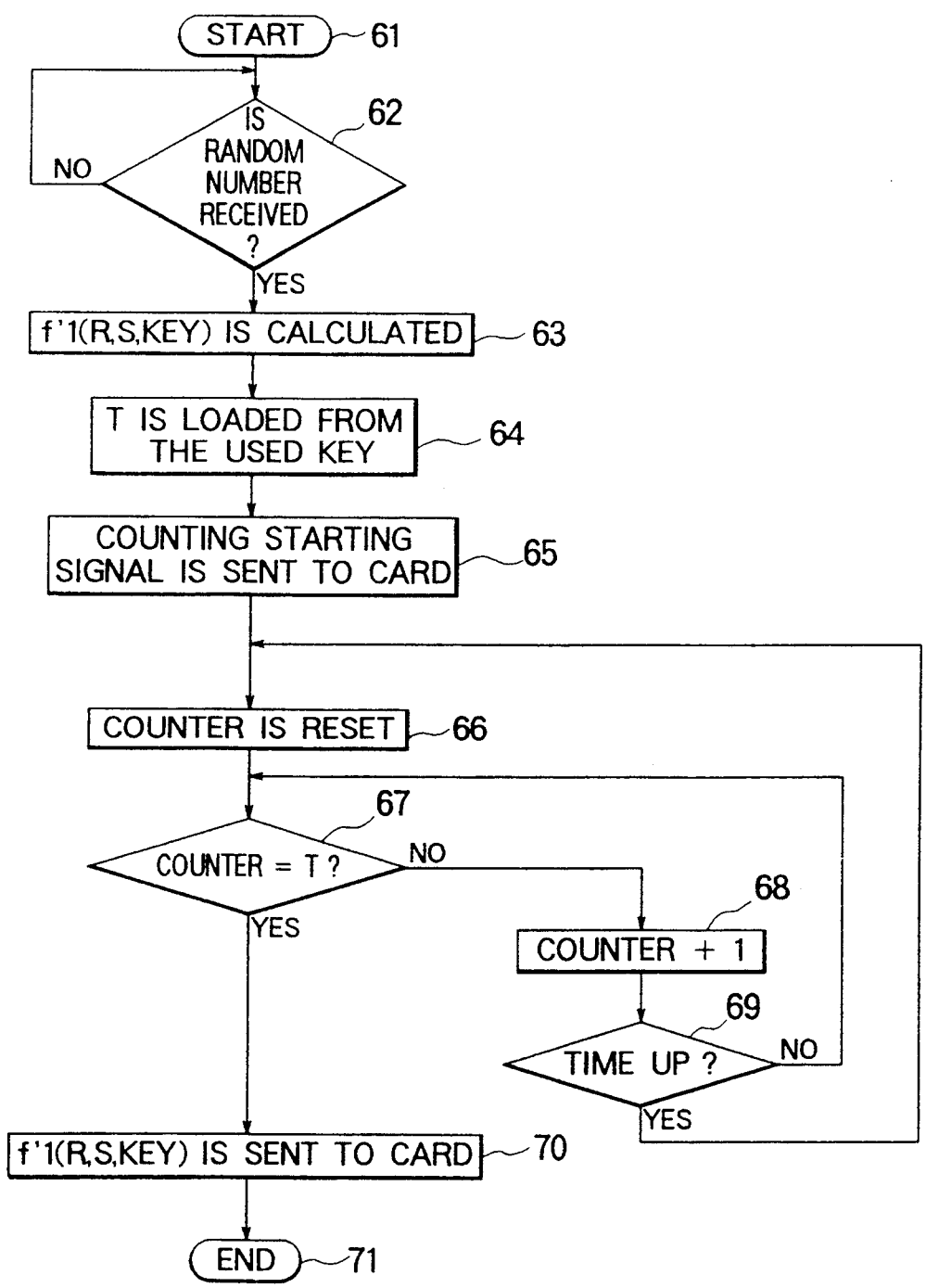
FIG. 5 is a flowchart showing the operation of the terminal unit in the authentication method according to the first embodiment of the present invention.

FIGS. 4 and 5 are flowcharts showing the authentication operation executed between the IC card and the terminal unit in the system shown in FIG. 2 according to the first embodiment of the present invention. FIG. 4 is a flowchart showing the operation of the IC card 13, while FIG. 5 is a flowchart showing the operation of the terminal unit 27. These operations are performed respectively by CPU 21 of the terminal unit 27 and CPU 1 of the IC card 13 according to an authentication program 22P stored in ROM 22 and an authentication program 1P stored in ROM 4.

The operation of the first embodiment according to the present invention will now be described with reference to FIGS. 2 through 5.

First, the authentication process in the first embodiment will be outlined. First, the IC card 13 generates a random number (R), and sends it to the terminal unit 27. The terminal unit 27 creates encrypted authentication data f'1 (R, S, KEY) on the basis of the encryption algorithm, e.g., the function of the encryption algorithm (f' 1), by utilizing a desired authentication code (KEY) and the system key (S) for encryption, and sends the created authentication data back to the IC card 13. It is not necessary for an actual authentication code (KEY) to be used. In the figures, the authentication codes are indicated by A, B, C, . . .

The IC card 13 similarly creates encrypted data f1 (R, S, KEY) on the basis of the function of the encryption algorithm (f 1), which is similar to the encryption algorithm (f' 1) of the terminal unit 27, from both the authentication code (KEY) stored in area 5-e of the data memory 5 of the IC card 13 itself and the system key (S) stored in area 5-d, and collates it with the encrypted data which has been sent from the terminal unit 27, i.e., authentication data f' 1 (R, S, KEY).

The first embodiment is intended to supply a desired authentication code to a remote party in a special way, e.g., not to supply it directly using an address or the like but to supply it utilizing the time interval between commands.

The operation of the first embodiment will be described in more detail with reference to FIGS. 4 and 5. As shown in FIG. 4, the IC card 13 generates a random number (R) according to the random number generation algorithm (Rm) stored in the area 5-a in the data memory 5 (step 42), and then sends it to the terminal unit 27 (step 43). Upon receipt of the random number (R) (step 62), the terminal unit 27 selects one authentication code (KEY) and creates authentication data f' 1 (R, S, KEY) using the selected authentication code (step 63). Thereafter, the terminal unit 27 selects the time data (either of TA, TB, TC, . . . ) corresponding to the selected authentication code (KEY) (A, B, C . . . ) from the time table (see FIG. 3) stored in the area 24-c of the data memory 24. For example, when the authentication code B is selected, the corresponding time data TB is selected (step 64).

Thereafter, the terminal unit 27 sends a count starting signal CSS to the IC card 13 in order to establish synchronization with the IC card 13 (step 65), and then resets the counter (sets the counting value to zero) (step 66). Both the terminal unit 27 and the IC card 13 may incorporate an exclusively used timer circuit 12 (see FIG. 1) as hardware or may employ a counter (not shown) which runs on software of the CPU. In the first embodiment, a counter which runs on the software of the CPU is used.

Similarly, the IC card 13 resets the counter (sets the counting value to zero) (step 45) upon receipt of the counting starting signal (CSS) (step 44), whereby synchronization between the terminal unit 27 and the IC card 13 is established. After the terminal unit 27 has transmitted the count starting signal (CSS), it waits for the time indicated by the time data set in the time table (steps 67, 68 and 69), and then transmits the authentication data f' 1 (R, S, KEY) to the IC card 13 (step 70). The IC card 13 counts the time from reception of the count starting signal (CSS) to when the authentication data f'1 (R, S, KEY) (steps 46, 47, 48), is received and obtains the authentication code selected on the basis of the time table stored in the area 5-e of the data memory 5, i.e., the authentication code from the counted value (steps 49, 50, 51, 52, 53, 54).

The IC card 13 calculates the encrypted authentication data f1 (R, S, KEY) from the selected authentication code (KEY) (step 55), and collates it with the authentication data f'1 (R, S, KEY) which has been received from the terminal 27 (steps 56, 57, 58). Subsequently, the IC card sends a collation result signal (RTN), indicating whether the two authentication data are coincident, to the terminal unit 27 (step 59).

Therefore, the authentication operation can be performed without the address at which the authentication code is stored being transmitted directly between the terminal unit 27 and the IC card 13. As a result, the address at which the authentication code is stored is not disclosed, and an authentication operation assuring a higher security can thus be performed.

Figure 6:
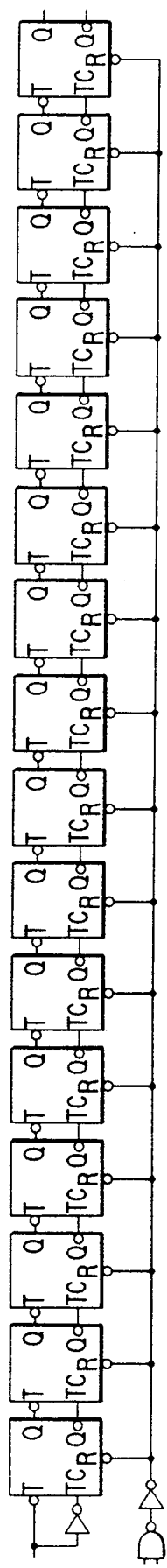
FIG. 6 shows an example of a timer circuit.

In the first embodiment, counting of the time is performed by the software of the CPU. However, both the IC card and the terminal unit may have an exclusively used timer circuit (see reference numeral 12 in FIG. 1). In that case, a timer counter such as that shown in FIG. 6, in which flip-flops are connected in series, may be used.

Figure 7:
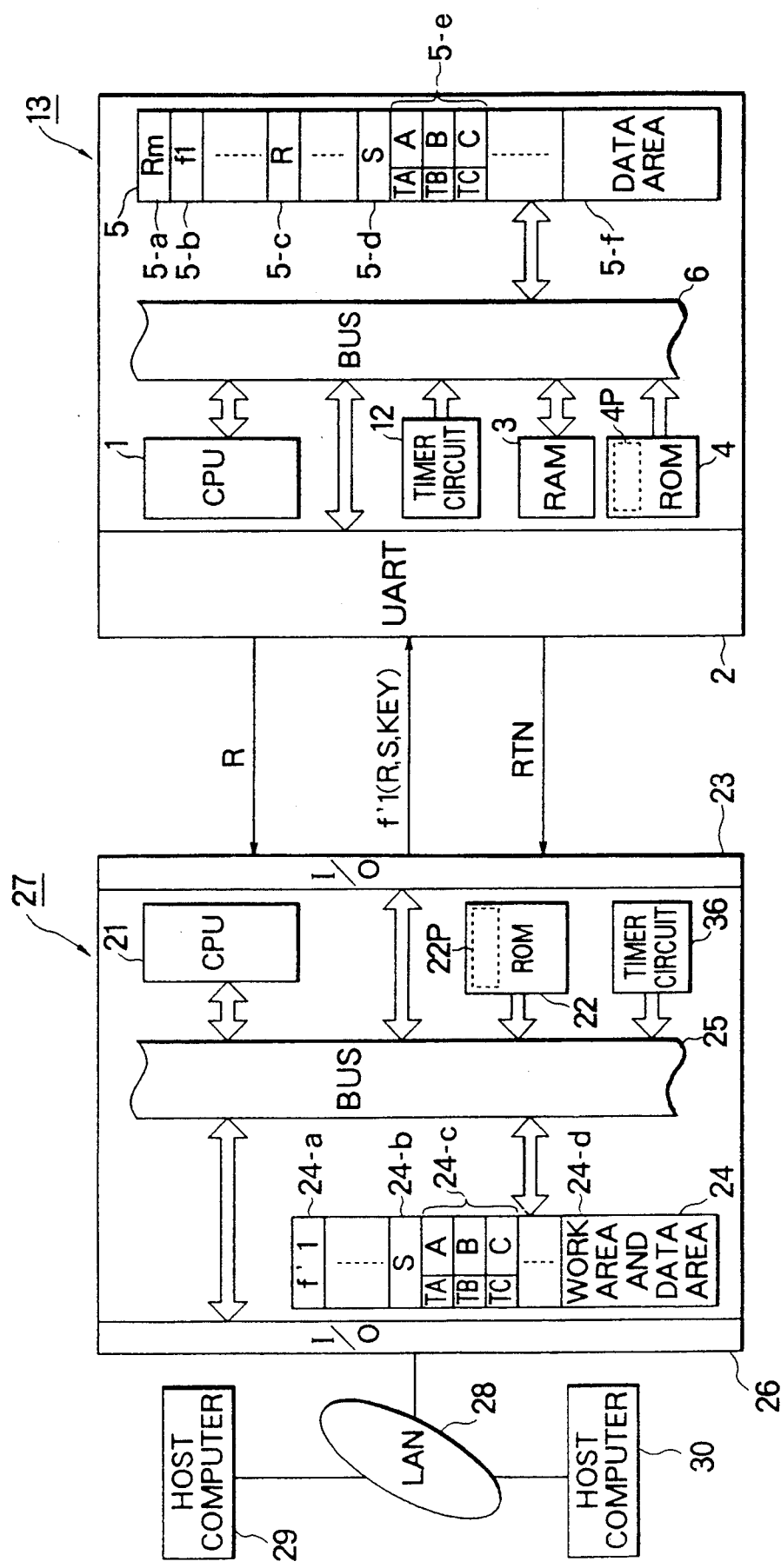
FIG. 7 is a block diagram showing the functional structure of a system including an IC card and a terminal unit according to a second embodiment of the present invention.
Figure 8:
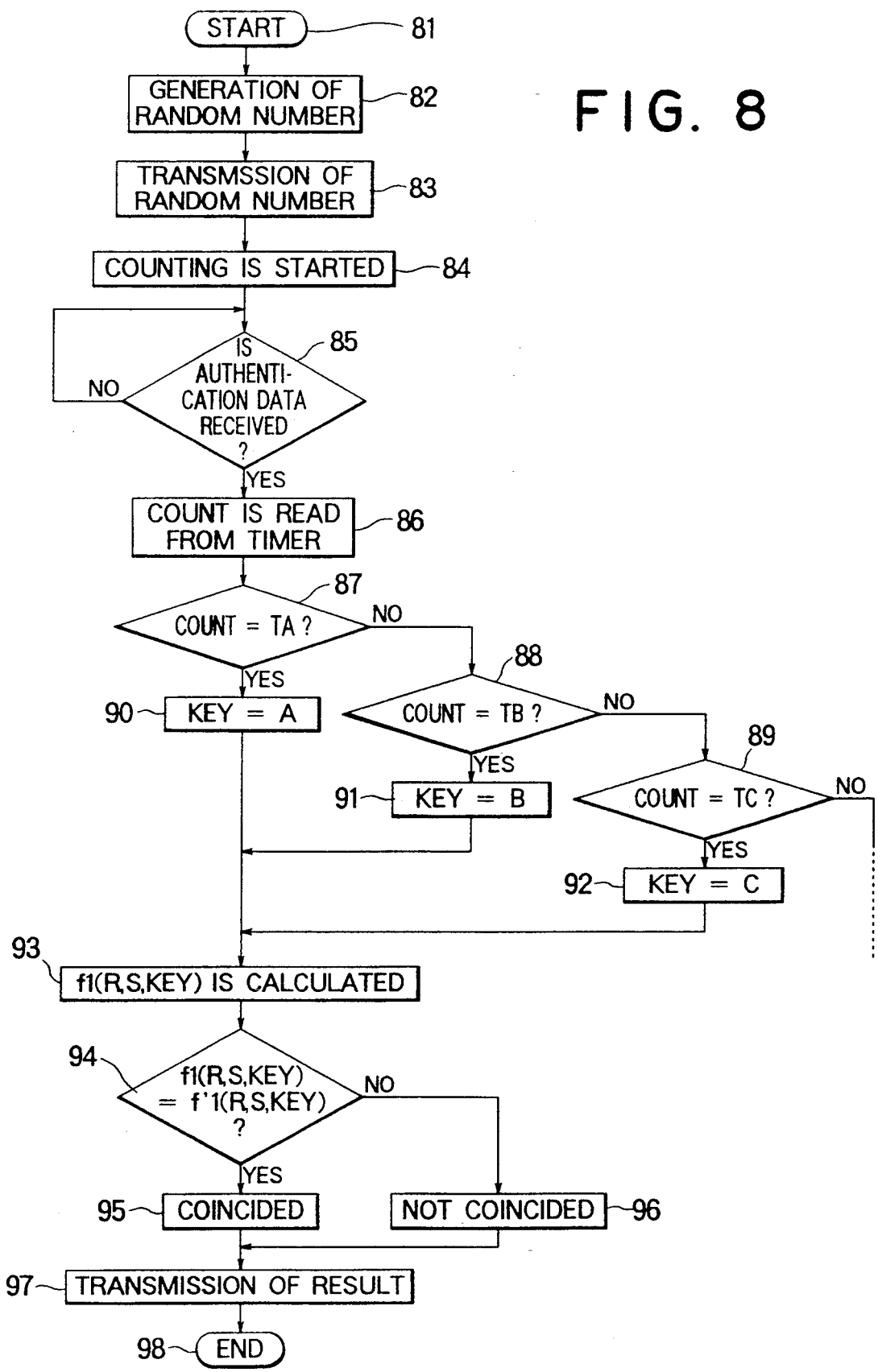
FIG. 8 is a flowchart showing the operation of the IC card in the authentication method according to the second embodiment of the present invention.
Figure 9:
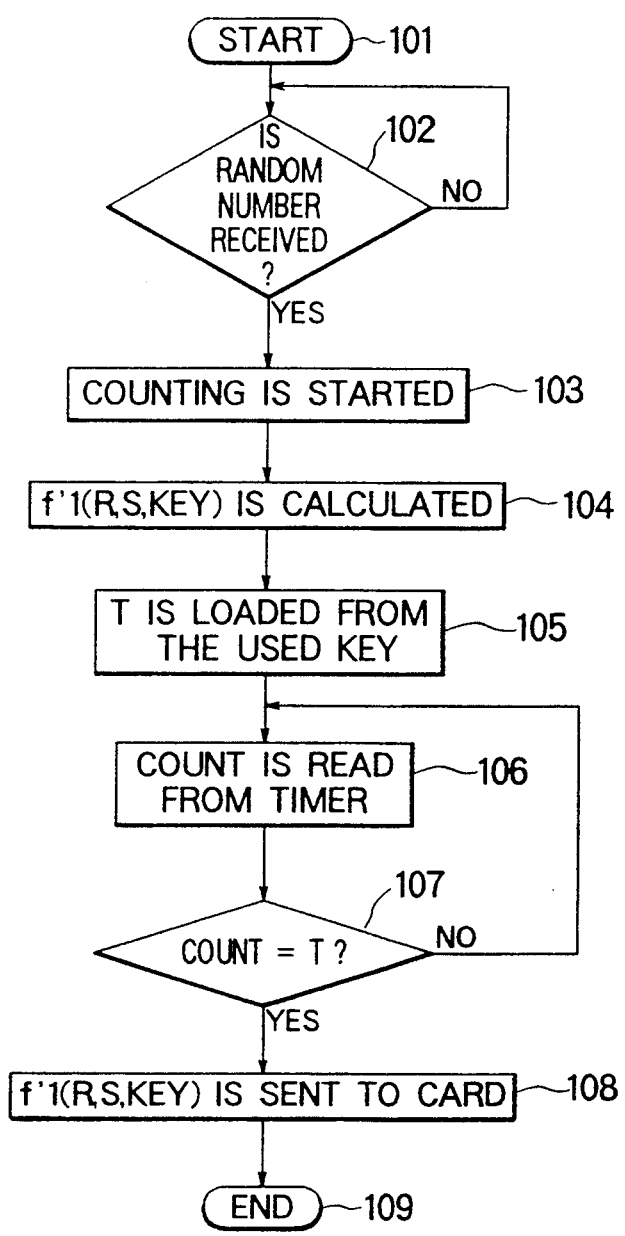
FIG. 9 is a flowchart showing the operation of the terminal unit in the authentication method according to the second embodiment of the present invention.

FIG. 7 is a block diagram showing the functional structure of a system including an IC card and a terminal unit and used in a second embodiment of the present invention. The second embodiment differs from the first embodiment shown in FIG. 6 in that a timer circuit 12, which is hardware, is provided in the IC card 13 while a timer circuit 36, which is hardware, is provided in the terminal unit 27, and in that it does not employ a count starting signal (CSS) sent from the terminal unit 27 to the IC card 13. FIGS. 8 and 9 are flowcharts showing the authentication operation which is executed in the second embodiment of the present invention between the IC card and the terminal unit in the system.

The operation of the second embodiment will be described below with reference to FIGS. 7 through 9. The operation of the second embodiment differs from the first embodiment in the method of obtaining the time data required to determine the desired authentication code (KEY). In this embodiment, synchronization between the IC card 13 and the terminal unit 27 is established when a random number is transmitted. As shown in FIGS. 8 and 9, the random number is transmitted from the IC card 13 (step 83), whereby counting is started in both the timer circuit 12 of the IC card 13 and the timer circuit 36 of the terminal unit 27. Here, it is regarded that the transmission of the random number from the IC card 13 and the reception of the random number by the terminal unit 27 occur concurrently. This also applies to transmission and reception of other signals or data. This is also the same in the first embodiment. The IC card counts the time interval from the transmission of the random number to the reception of the encrypted authentication data f'1 (R, S, KEY) created in the terminal unit 27, and obtains the desired authentication code (KEY) from the counted time (steps 87, 88, 89, 90, 91, 92). Since the other processing is the same as that of the first embodiment, description thereof is omitted.

In the first and second embodiments, time data (TIME) is allocated to each of the authentication codes (KEY) and this time data is sent as the time interval between the commands or signals. The authentication method which utilizes a plurality of encryption algorithms will be described below.

Figure 10:
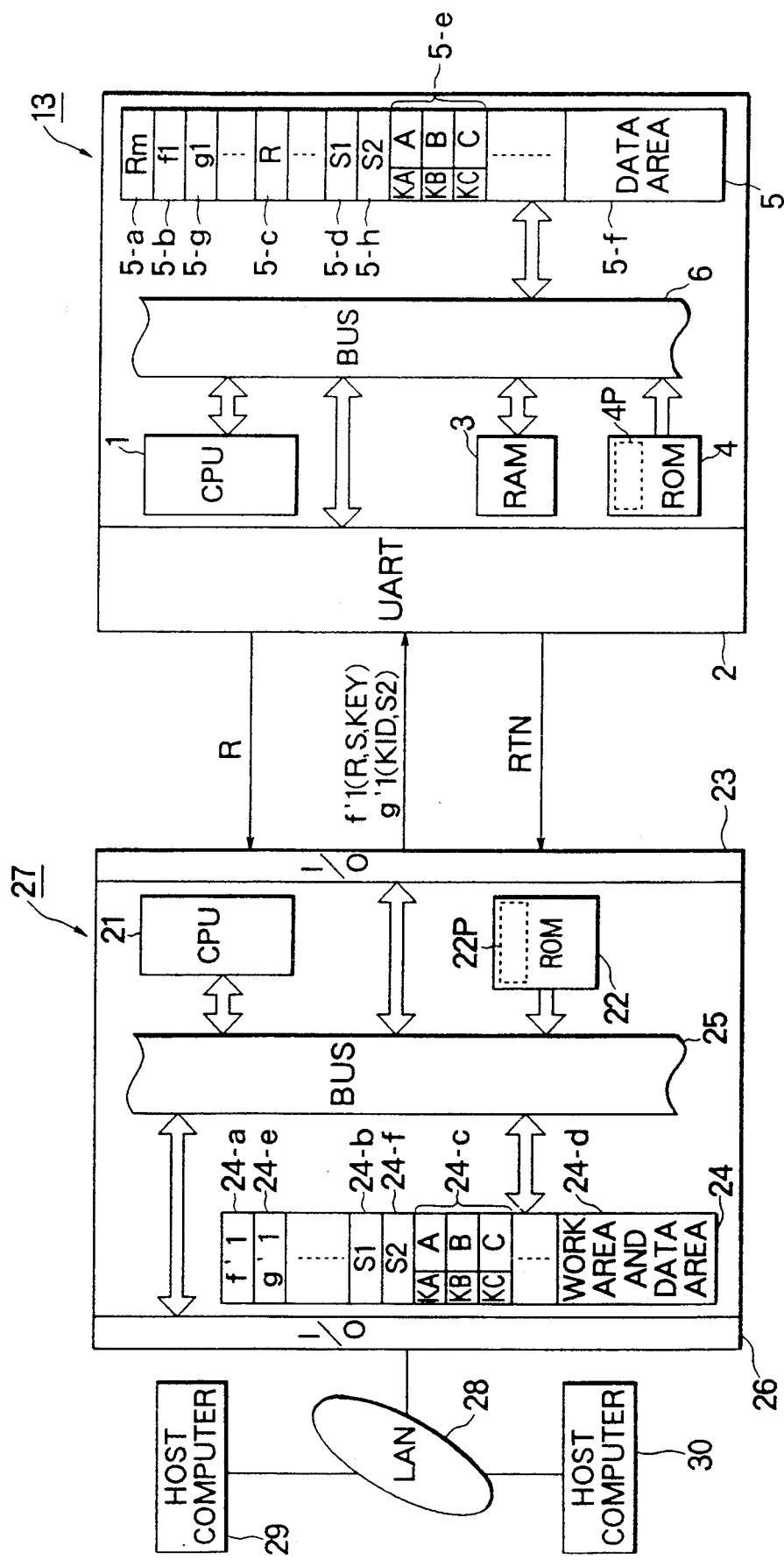
FIG. 10 is a block diagram showing the functional structure of a system including an IC card and a terminal unit according to a third embodiment of the present invention.
Figure 11:
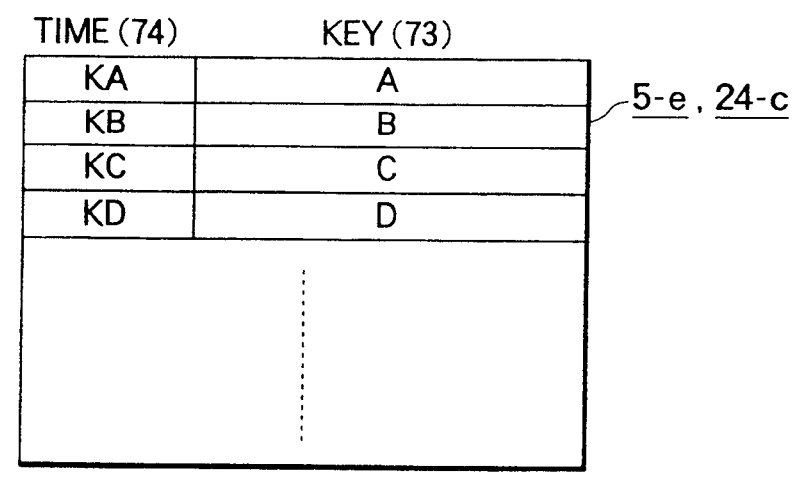
Figure 12:
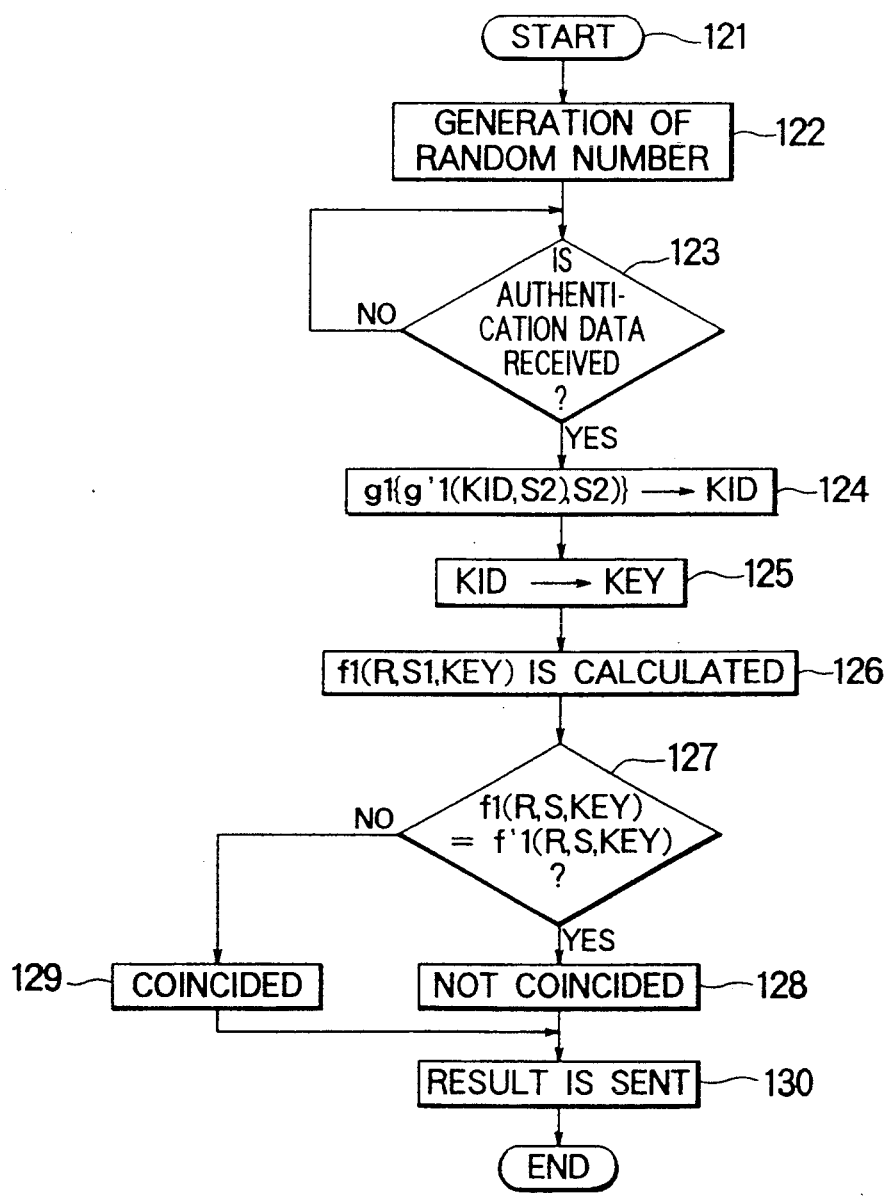
FIG. 12 is a flowchart showing the operation of the IC card in the authentication method according to the third embodiment of the present invention.
Figure 13:
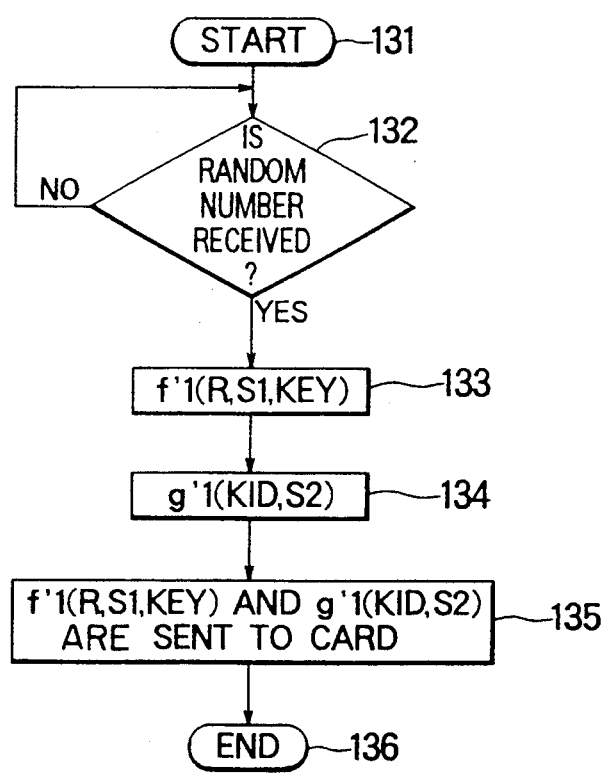
FIG. 13 is a flowchart showing the operation of the terminal unit in the authentication method according to the third embodiment of the present invention.

FIG. 10 is a block diagram showing the functional structure of a system including of an IC card and a terminal unit and used in a third embodiment of the present invention. FIG. 11 shows the contents of the area 5-e in the data memory of the IC card 13 and of the area 24-c in the data memory 24 of the terminal unit 27. FIGS. 12 and 13 are flowcharts showing the authentication operation executed in the third embodiment according to the present invention between the IC card and the terminal unit in the system shown in FIG. 10.

The system shown in FIG. 10 differs from the first and second embodiments in that two encryption algorithms f1, g1 and two system keys S1, S2 are stored in the data memory 5 of the IC card 13 while two encryption algorithms f'1, g'1 and two system keys S1, S2 are stored in the data memory 24 of the terminal unit 27, and in that a table shown in FIG. 11 is stored in the areas 5-e, 24-c of the data memories 5 and 24. The table of FIG. 11 shows identifiers (KID) allocated to the individual authentication codes (KEY), respectively.

The operation of the third embodiment will be described below with reference to FIGS. 10 through 13.

The IC card 13 transmits a random number (R) (step 122). Upon receipt of the random number (R) (step 132), the terminal unit 27 creates the encrypted authentication data f'1 (R, S1, KEY) in the same manner as that of the previous embodiments using the desired authentication code (KEY) (step 133), and at the same time creates data g'1 (KID, S2) by encrypting the identifier (KID) of the authentication code (KEY) which has been obtained from the table shown in FIG. 11 (step 134). The IC card 13 transmits the created two authentication data f'1 (R, S1, KEY) and g'1 (KID, S2) to the IC card 13.

When the IC card 13 receives the authentication data (step 123), it combines g'1 (KID, S2) to obtain KID (step 124), and then obtains the desired authentication code (KEY) from the KID on the basis of the table stored in the data memory 5 (step 125). Thereafter, the IC card 13 calculates the encrypted authentication data f1 (R, S1, KEY) using the authentication code (step 126), and collates it with the authentication data f'1 (R, S1, KEY) which has been transmitted from the terminal unit 27 (steps 127, 128, 129). The IC card 13 transmits the result signal (RTN) indicating coincidence or non-coincidence to the IC card 13 (step 130).

Thus, the authentication operation can be performed without the address at which the authentication code is stored being disclosed.

Generally, there is the limitation to the resources including the capacity of ROM, the capacity of RAM and data memory, and the programs, such as the encryption algorithms (f1, g'1), may not be able to be stored in the IC card. In addition, in some application programs, a plurality of encryption algorithms may be selectively employed. In order to overcome such a problem, a fourth embodiment of the present invention is designed to load the encryption algorithms from the terminal unit 27 to the IC card 13 before the authentication operation is initiated.

Figure 14:
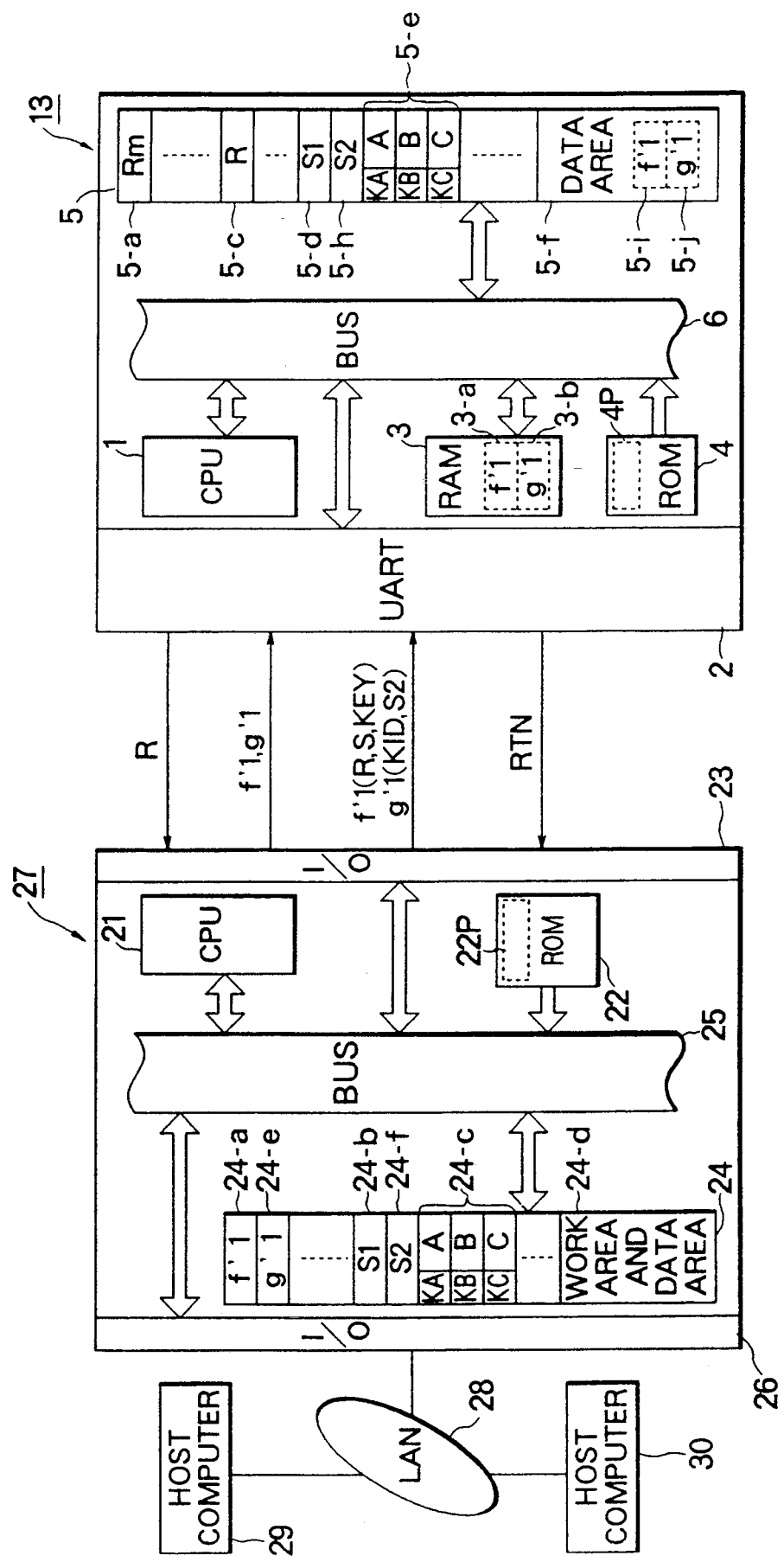
FIG. 14 is a block diagram showing the functional structure of a system including an IC card and a terminal unit according to a fourth embodiment of the present invention.
Figure 15:
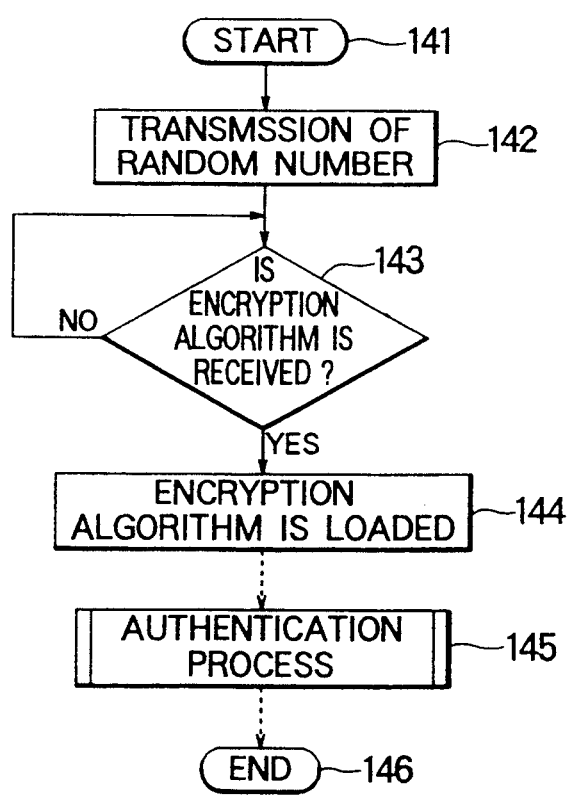
FIG. 15 is a flowchart showing the operation of the IC card in the authentication method according to the fourth embodiment of the present invention.

FIG. 14 is a block diagram showing the functional structure of a system including an IC card and a terminal unit used in a fourth embodiment according to the present invention. The fourth embodiment differs from the third embodiment shown in FIG. 10 in that the encryption algorithms f1, g1 are not stored in the data memory 5 of the IC card 13. FIG. 15 is a flowchart showing the operation of the IC card which is executed in the authentication operation between an IC card and a terminal unit in the fourth embodiment of the present invention.

In this embodiment, after the IC card 13 generates a random number (R) (step 142), the transmission unit 27 transmits the encryption algorithms (f'1) (g'1) to the IC card 13 (step 143). The IC card 13 loads the encryption algorithms (f'1)(g'1) in either the areas 3-a and 3-b of RAM 3 or empty areas 5-i and 5-j of the data memory 5 (step 144). Thereafter, the same authentication operation as that executed in the previous embodiments is performed (step 145). Transmission of the encryption algorithms from the terminal unit to the IC card prior to the authentication process can be applied to each of the previous embodiments.

An embodiment intended to improve security regarding a transaction between the IC card and the terminal unit will be described below. In this embodiment, the number of times that transaction is performed is counted, and when that counted value reaches a certain set value, e.g., 100, authentication by another authentication code is conducted.

Figure 16:
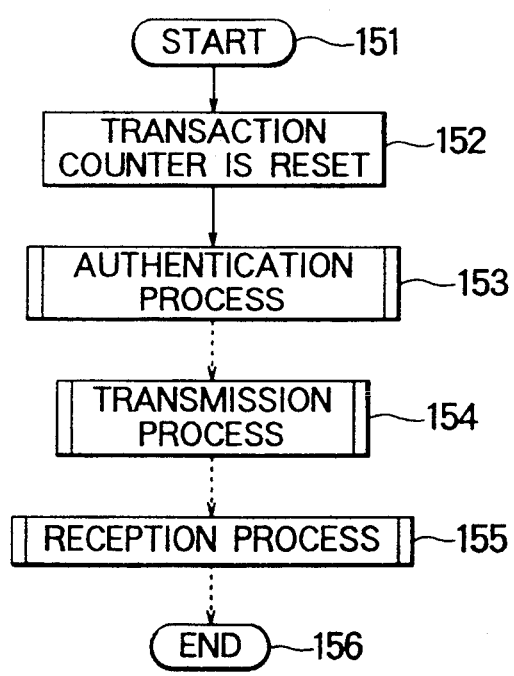
FIG. 16 is a flowchart showing the operation of the terminal unit in the authentication method according to the fifth embodiment of the present invention.
Figure 17:
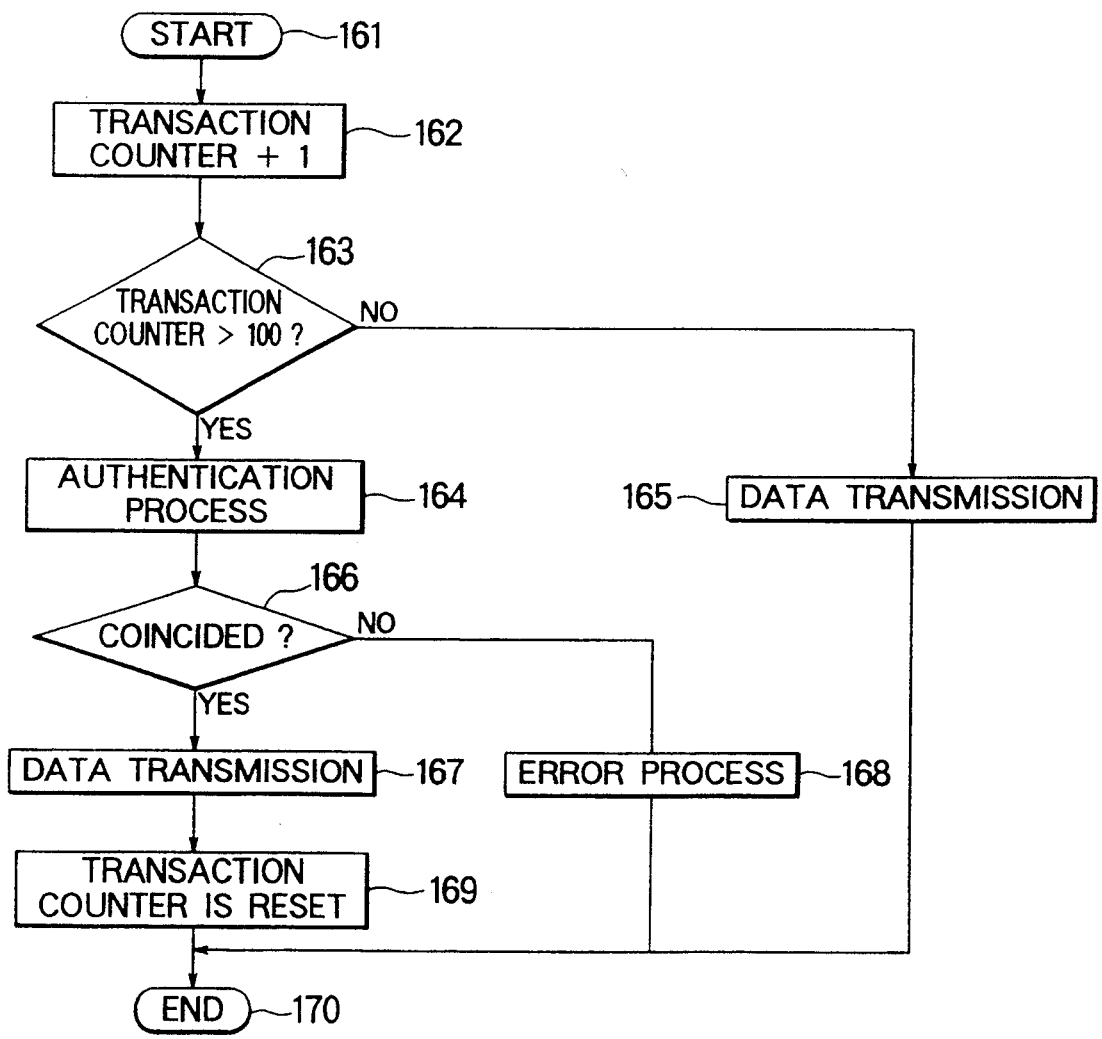
FIG. 17 is a flowchart showing the transmission process in FIG. 16 in detail.
Figure 18:
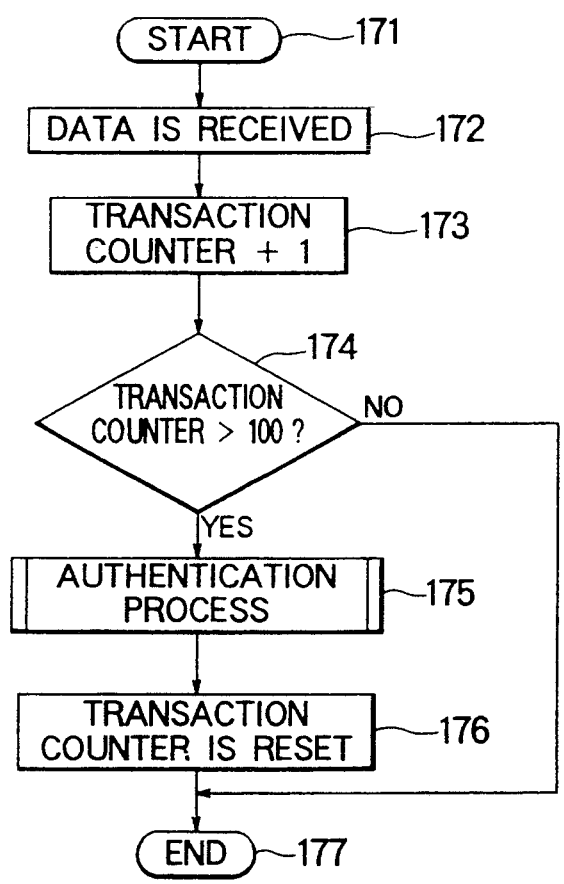
FIG. 18 is a flowchart showing the reception process in FIG. 16 in detail.

FIGS. 16 through 18 are flowcharts showing the authentication method between an IC card and a terminal unit according to a fifth embodiment of the present invention. FIGS. 17 and 18 respectively show the transmission and reception processes in FIG. 16 in detail. The operation of the fifth embodiment will be described with reference to FIGS. 16 through 18.

In this embodiment, the number of times that a transaction is performed between the IC card and the terminal unit is counted by, for example, incrementing the number of times that a transaction is performed in either CPU 1 of the IC card 13 or CPU 21 of the terminal unit 27 shown in FIG. 2. Prior to the first authentication process (step 153 in FIG. 16), the transaction counter in CPU is reset (step 152). Thereafter, transmission and reception of data between the IC card 13 and the terminal unit 27 occur in various subsequent processes. In a subsequent authentication process, the number of times that these transmissions and receptions are performed is counted.

FIG. 17 shows the operation of the transmission process in FIG. 16 (step 154) in detail. Prior to the transmission, the transaction counter is incremented by +1 (step 162), and it is then determined whether the number of transactions has reached 100 (step 163). If the number of transactions has reached 100, the authentication process uses another authentication code (step 164). If a correct authentication is performed, the data is transmitted, and then the transactional counter is reset (steps 167, 168, 169). If the number of transactions has not reached 100, the data is transmitted without change (step 165).

In the reception process (step 155), after the data has been received (step 172), the transaction counter is incremented by +1 (in step 173), and then it is determined whether the number of transactions has reached 100 (step 174), as shown in FIG. 18. If the number of transactions has reached 100, the authentication process is performed using another authentication code (step 175), and then the transaction counter is reset (step 176). If the number of transactions has not yet reached 100, the control flow proceeds to a subsequent process.

Figure 19:
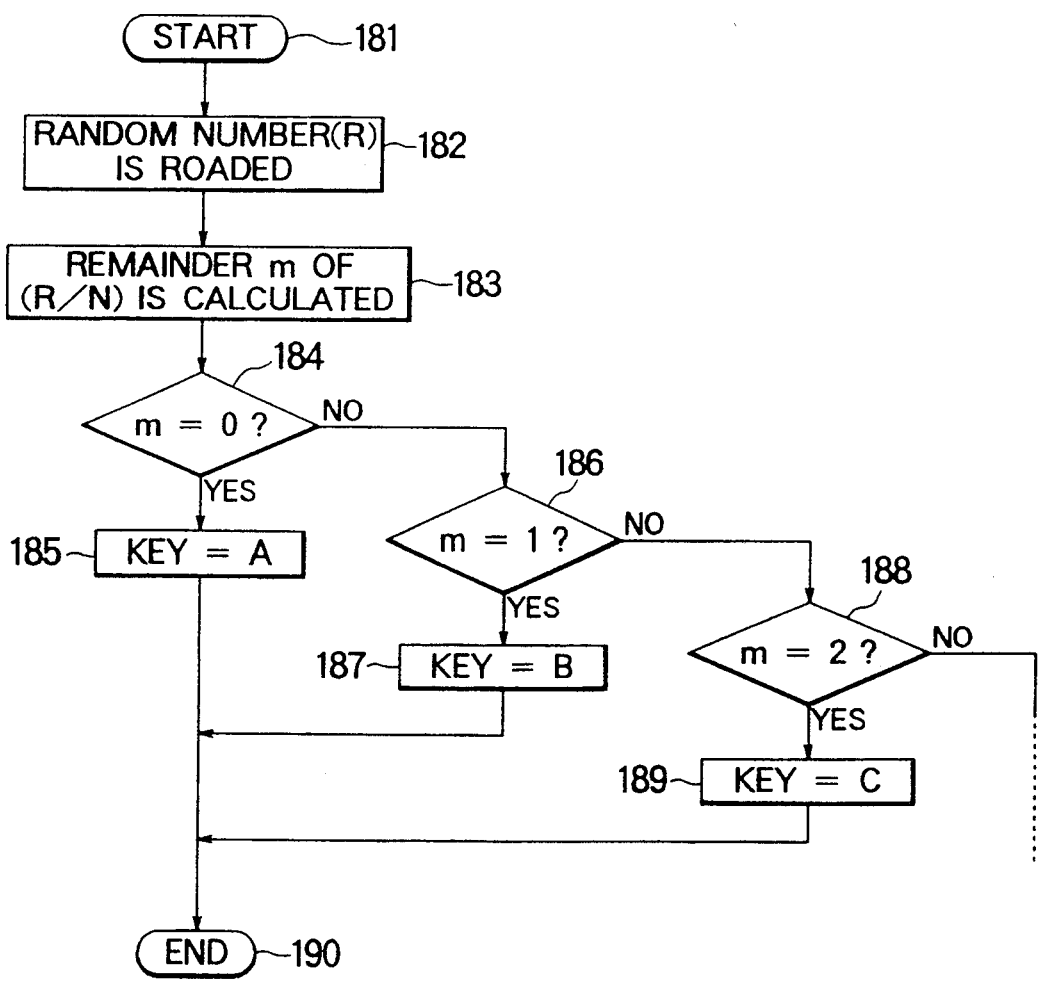
FIG. 19 is a flowchart showing the operation of authentication method according to a sixth embodiment of the present invention.

In a case where a plurality of authentication codes (KEY) is used, security is further assured by adding a method of randomly selecting the authentication code used for authentication. FIG. 19 is a flowchart showing the operation of the authentication method according to a sixth embodiment of the present invention in which a function of randomly selecting the authentication code utilizing a random number is added. The operation of the sixth embodiment will be described below.

If the number of authentication codes (KEY) (A, C, . . . ) is, for example, N, the random numbers (R) are divided by the number of authentication codes (KEY), N, to obtain a remainder m (step 183). An authentication code can be selected randomly by selecting m+1th authentication code (KEY) (steps 184 through 189). If m=0, the first authentication code (A) is selected. If m=1, the second authentication code (B) is selected.

In all the aforementioned embodiments, a description has been made with some operations limited to either of the IC card and the terminal unit. However, the same authentication operation can be performed even when the limitation is reversed, for example, generation of a random number in the IC card. However, it may be performed in the terminal unit.

Furthermore, the authentication method between the IC card and the terminal unit has been described in the above-described embodiments. However, it can be applied to any two devices if they require authentication (for example, to two terminal units or to two systems).

As will be understood from the foregoing description, in the present invention, since the authentication operation can be performed between an IC card and a terminal unit without the authentication code or the address where the authentication code is stored being directly transmitted, an authentication method and a system therefor assuring high security is provided without the contents of the authentication code and the address therefor being known to an unauthorized user.

What is claimed is:

1. An authentication method for authentication between an IC card and a terminal unit in which both said IC card and said terminal unit include a plurality of authentication codes, each code having a corresponding time data item, encryption means for encrypting data according to a predetermined algorithm, and timer means, one of said IC card and said terminal unit, including means for generating random numbers and comparison means, said authentication method comprising:

generating a random number in a first device selected from an IC card and a terminal unit and transmitting the generated random number to a second device that is the other of said IC card and said terminal unit;

a first encryption step of encrypting the received random number in the second device according to an algorithm using one of a plurality of authentication codes as a key to generate authentication data;

transmitting the encrypted authentication data to the first device from the second device when a time represented by time data corresponding to the authentication code used has elapsed after transmission of a predetermined signal;

a second encryption step of counting, in the first device, a time interval from transmission of a predetermined signal to reception of the authentication data from the second device and of encrypting the random number according to the algorithm using, as a key, the authentication code corresponding to the time data which coincides with the time interval counted in the second device to generate authentication data; and comparing in the first device the authentication data generated in said second encryption step with the authentication data transmitted from the second device and transmitting a result signal indicating coincidence or non-coincidence of the two authentication data to the second device.

2. An authentication method according to claim 1 comprising transmitting a count starting signal to the first device from the second device after the second device has received the random number wherein the authentication data is transmitted to the first device when the time represented by the time data corresponding to the authentication code has elapsed after transmission of the count starting signal and wherein, in the second encryption step, the time interval from when the count starting signal has been received to when the authentication data is received is counted in the first device and the random number is encrypted according to the algorithm using, as a key, the authentication code corresponding to the time data which coincides with the counted time interval in the same manner as in the second device.

3. An authentication method according to claim 1 wherein the authentication data is transmitted to the first device when the time represented by the time data corresponding to the authentication code has elapsed after reception of the random number by the second device and wherein, in the second encryption step, the time interval from when the random number has been transmitted to when the authentication data is received is counted in the first device and the random number is encrypted according to the algorithm using, as a key, the authentication code corresponding to the time data which coincides with the counted time interval in the same manner as in the second device.

4. An authentication method according to claim 1 comprising loading the encryption algorithm from said terminal unit into said IC card prior to the transmission of the random number.

5. An authentication method according to claim 1 wherein, in the first encryption step, transactions between said IC card and said terminal unit are counted and the authentication code to be selected is changed when the counted transactions have reached a predetermined value.

6. An authentication method according to claim 1 wherein both said IC card and said terminal unit have N authentication codes, and wherein in said first encryption step, if a remainder obtained by dividing the random number by N is m, the M+1th authentication code is selected.

7. A system including an IC card and a terminal unit, said system performing an authentication operation between said IC card and said terminal unit, both of said IC card and said terminal unit comprising:
storage means for storing at least a single encryption algorithm, at least a single system key, a plurality of authentication codes, each code having a corresponding time data item, and programs including an authentication program for authentication;
input/output control means for input/output control of data;
data control/processing means for processing and controlling data according to the programs stored in said storage means and for authentication according to the authentication program;
timer means for counting time; and
bus means connecting said storage means, said input/output means, said data control/processing means, and said timer means with each other;
a first device of said IC card and said terminal unit comprising:
means for generating a random number and for transmitting the generated random number to a second device that is the other of said IC card and said terminal unit;
first encryption means for counting a time interval from transmission of a predetermined signal to reception of encrypted authentication data from the second device using said timer means and for encrypting the random number according to the encryption algorithm using, as a key, the authentication code corresponding to the time data that coincides with the time interval in the same manner as the second device to generate authentication data; and
means for comparing the authentication data generated by said encryption means with the authentication data transmitted from the second device and for transmitting a resultant signal indicating coincidence or non-coincidence of the two authentication data to the second device according to said data control/processing means;
the second device comprising:
Second encryption means for encrypting a random number received from the first device according to the algorithm using, as a key, one of the plurality of authentication codes to generate authentication data; and
means for transmitting the authentication data generated by said second encryption means when a time represented by the time data corresponding to the authentication code has elapsed after transmission of the predetermined signal according to the authentication program.

8. A system including an IC card and a terminal unit according to claim 7 wherein the predetermined signal is the random number transmitted from the first device to the second device.

9. A system including an IC card and a terminal unit according to claim 7 wherein the second device comprises means for transmitting a count starting signal to the first device and wherein the predetermined signal is a count starting signal.

10. A system including an IC card and a terminal unit according to claim 7 wherein said terminal unit comprises algorithm loading means for loading the algorithm into said IC card when said IC card has not stored the algorithm beforehand.

11. A system including an IC card and a terminal unit according to claim 7 wherein the second device comprises authentication code selection means for counting transactions between said IC card and said terminal unit and for changing the authentication code when the counted transactions have reached a predetermined value.

12. A system including an IC card and a terminal unit according to claim 7 wherein both said IC card and said terminal unit have N authentication codes and wherein said second device comprises authentication code selection means for selecting m+1th authentication code when a remainder obtained by dividing the random number by N is m.

13. An authentication method for authentication between two electrical devices in which both said electrical devices contain a plurality of authentication codes, each code having a corresponding time data item, encryption means for encrypting data according to a predetermined algorithm, and timer means, one of said two electrical devices including means for generating random numbers and comparison means, said authentication method comprising:
generating a random number in a first of two electrical devices and transmitting the generated random numbers to a second of said two electrical devices;
a first encryption step of encrypting the received random number in the second device according to an algorithm using one of a plurality of authentication codes as a key to generate authentication data;
transmitting the authentication data to the first device from the second device when a time represented by the time data corresponding to the authentication code used has elapsed after transmission of a predetermined signal;
a second encryption step of counting in the first device a time interval from transmission of the predetermined signal to reception of the authentication data from the second device and of encrypting the random number according to the algorithm using, as a key, the authentication codes corresponding to the time data which coincides with the time interval counted to generate authentication data; and
comparing in the first device the authentication data generated in said second encryption step with the authentication data transmitted from the second device and transmitting a result signal indicating coincidence or non-coincidence of the two authentication data to the second device.

* * * * *